United States Patent [19]

Sato et al.

[11] 4,137,471
[45] Jan. 30, 1979

[54] STATOR WINDING STRUCTURE FOR GAP WINDING TYPE ELECTRIC ROTARY MACHINE

[75] Inventors: Masaki Sato; Mashatoshi Watanabe; Noriyoshi Takahashi; Miyoshi Takahashi, all of Hitachi, Japan

[73] Assignee: Hitachi, Ltd., Japan

[21] Appl. No.: 752,100

[22] Filed: Dec. 20, 1976

[30] Foreign Application Priority Data

Dec. 25, 1975 [JP] Japan .................... 50-156246

[51] Int. Cl.² ............................................. H02K 5/24
[52] U.S. Cl. ...................................... 310/51; 310/43; 310/45; 310/258; 336/100; 264/272
[58] Field of Search ................. 310/254, 51, 214, 258, 310/215, 259, 194, 208, 269, 179, 43, 45, 180, 184; 336/100; 264/272

[56] References Cited

U.S. PATENT DOCUMENTS

| 863,207 | 8/1907 | Olds | 310/194 |
|---|---|---|---|
| 3,082,337 | 3/1963 | Horsley | 310/179 |
| 3,157,939 | 11/1964 | Blake | 310/45 |
| 3,194,993 | 7/1965 | Hackney | 310/45 |
| 3,253,170 | 5/1966 | Phillips | 310/51 |
| 3,405,297 | 10/1968 | Madsen | 310/258 |
| 3,777,197 | 12/1973 | Preston | 310/254 |
| 3,838,502 | 10/1974 | Sheets | 310/45 |
| 3,963,950 | 6/1976 | Watanabe | 310/179 |
| 4,025,840 | 5/1977 | Brissey | 310/214 |

Primary Examiner—R. Skudy
Attorney, Agent, or Firm—Craig & Antonelli

[57] ABSTRACT

In a gap winding type electric rotary machine, a stator winding consisting of a plurality of stator coils is mounted on the inner surface of a stator core within the air gap defined by the clearance between the stator core and the rotor core, in such a manner that the stator coils are grouped together in a plurality of stator coil units and each stator coil unit is encapsulated in a solid casing comprising an outer cover fixed to the inner surface of the stator core through an elastic sheet and an inner cover closing the outer cover. The inner clearance within the solid casing is also provided with an elastic sheet.

9 Claims, 3 Drawing Figures 4,137,471

STATOR WINDING STRUCTURE FOR GAP WINDING TYPE ELECTRIC ROTARY MACHINE

BACKGROUND OF THE INVENTION

The present invention relates to improvements in a stator winding structure for a gap wwinding type electric rotary machine, in which the stator winding is disposed within a gap defined between the stator core and the rotor core thereof.

In general, the stator winding for a gap winding type electric rotary machine is disposed in a gap between the stator core and the rotor core, and is mounted on the inner surface of the stator core by coil supporting members which project from the inner surface of the stator core in the radial direction. As a result, the stator winding such as provided in the gap winding type electric rotary machine is much more directly influenced by the main magnetic flux of the machine than the stator winding for a slot winding type electric rotary machine in which the stator winding is wound within slots provided on the inner surface of the stator core.

Therefore, in the gap winding type electric rotary machine, fine wires of about 1.0 mm in diameter are usually formed as a strand and bundled together to form one stator conductor. Each stator conductor has a covering insulation over the outer periphery of the stator conductor. Further, a plurality of such stator conductors are gathered and an earth insulation is provided on all of the surfaces to form one stator coil. Every stator coil, or a plurality of such stator coils thus formed, is then mounted on the inner surface of the stator core by means of coil supporting members.

U.S. Pat. No. 3,405,297 to K. D. Madsen shows one example of this kind of stator winding structure, in which the stator winding comprises a plurality of stator coils, each of which is composed of a plurality of conductors respectively surrounded by a suitable insulating material and bundled together to form one stator coil. The stator coil is further solidified by a suitable insulating material surrounding the stator coil and then mounted on the inner surface of the stator core with the assistance of a plurality of coil supporting members projecting from the inner surface of the stator core.

In another embodiment of the prior art, for example, as disclosed in U.S. Pat. No. 3,082,337 to W. D. Horsley, a stator winding comprising a plurality of stator coils is embedded in a detachable cylinder composed of a suitable casting resin, for example, an epoxy-resin, and fixed to the inner surface of the stator core.

However, as described before, the electromagnetic forces generated in the stator coils of a gap winding type electric rotary machine become very large with the aid of the main flux in the air gap. Further, these electromagnetic forces are directly applied to the respective stator coils adjacently disposed in the air gap, which tends to cause various vibration modes in the respective stator coils. The magnitudes, phases and directions of the vibration produced in the respective stator coils are different from each other; therefore, each stator coil oscillates with vibrations different in magnitude, phase and direction from the other stator coils. The electromagnetic forces thus produced with respectively different magnitudes, phase, and directions are exerted on the stator core as individual vibration sources in the electric rotary machine.

Consequently, the stator core suffers from vibrating stresses, local abnormal oscillations and noises. Also, the electrical insulations surrounding the respective stator coils are conspicuously degraded by the vibrating stresses, and local losses and temperature rises are induced in the coils.

SUMMARY OF THE INVENTION

One object of the present invention is to provide a stator winding structure for a gap winding type electric rotary machine, in which vibrations produced by electromagnetic forces are reduced.

Another object of the present invention is to provide a durable stator winding structure for a gap winding type electric rotary machine.

Still another object of the present invention is to provide a stator winding structure for a gap winding type electric rotary machine which is easy to fabricate.

According to features of the present invention, a stator winding for a gap winding type electric rotary machine, which is disposed within a gap defined between a stator core and a rotor core, is divided into a plurality of coil unit groups, and each or a plurality of the coil unit groups grouped together is or are encapsulated in enveloping means. Each enveloping means is fixed to the inner surface of the stator core by supporting means. Thereby, vibrations thus produced with respectively different magnitudes, phase, and directions are exerted on the stator core as individual vibration sources in the electric rotary machine.

Consequently, the stator core suffers from vibrating stresses, local abnormal oscillations and noises. Also, the electrical insulations surrounding the respective stator coils are conspicuously degraded by the vibrating stresses, and local losses and temperature rises are induced in the coils.

SUMMARY OF THE INVENTION

One object of the present invention is to provide a stator winding structure for a gap winding type electric rotary machine, in which vibrations produced by electromagnetic forces are reduced.

Another object of the present invention is to provide a durable stator winding structure for a gap winding type electric rotary machine.

Still another object of the present invention is to provide a stator winding structure for a gap winding type electric rotary machine which is easy to fabricate.

According to features of the present invention, a stator winding for a gap winding type electric rotary machine, which is disposed within a gap defined between a stator core and a rotor core, is divided into a plurality of coil unit groups, and each or a plurality of the coil unit groups grouped together is or are encapsulated in enveloping means. Each enveloping means is fixed to the inner surface of the stator core by supporting means. Thereby, vibrations produced by electromagnetic forces in the enveloping means are reduced and made more uniform.

BRIEF DESCRIPTION OF THE DRAWINGS

Description of the present invention will be made with reference to the accompanying drawings in which.

DESCRIPTION OF THE PREFERRED EMBODIMENT

Figure 1:
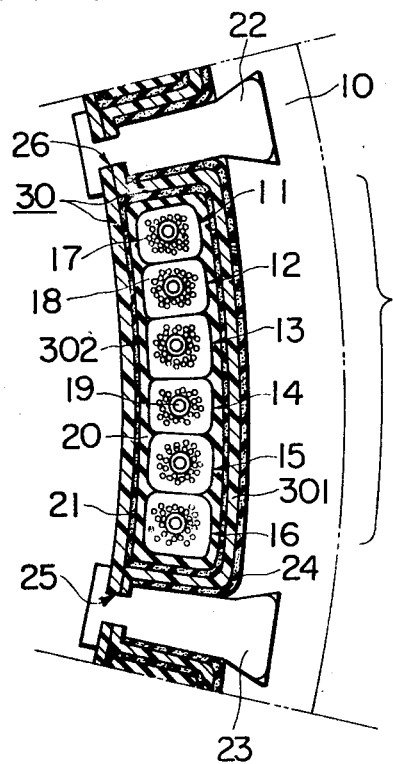
FIG. 1 is a transverse sectional view of a stator winding structure of one embodiment of the present invention.

Referring now to FIG. 1 of the drawings, there is illustrated one embodiment of the stator winding structure of the present invention, applied to a single-layer winding of a gap winding type electric rotary machine, in which a stator coil 100 and adjacently disposed stator coils, which are partly shown, are mounted on the inner surface of a stator core 10 within an air gap defined by the stator core 10 and a rotor core (not shown).

Each stator conductor 11 to 16 is formed of a bundle of fine wires 17 as a strand and a covering insulation 18 on the outer periphery of the strand. A cooling pipe 19 is respectively provided through the stator conductors 11 to 16 along the fine wires 17 for coil cooling purposes. Six stator conductors 11 to 16 thus formed are grouped together to form one stator coil 100 with an earth insulation layer 20 surrounding the outer periphery of the grouped stator conductors 11 to 16. On the outer periphery of the stator coil 100, there is further provided an elastic sheet 21 for absorbing vibrations of the stator coil 100. The stator coil 100 covered with the earth insulation 20 and the elastic sheet 21 is integrally held and fixed in a solid casing 30. The solid casing 30 is attached and fixed to the inner surface of the stator 10 by supporting sticks 22 and 23 which are fixed at one end in key slots in the stator core and project in the radial direction into the air gap.

The solid casing 30 in this embodiment is formed of two components, that is, an outer cover 301 contacting the inner surface of the stator core 10 and an inner cover 302 for covering the outer cover 301. The details of the solid casing 30 will be later described with reference to FIG. 2. In the clearance between the outer cover 301 and the stator core 10, there is also provided an elastic sheet 24 for absorbing the vibrations of the stator coil 100. The end portions of the outer and inner cover 301, 302 are fit in grooves 25, 26 provided on the coil supporting sticks 22, 23 and fixed therein.

By the employment of the solid casing 30, the electromagnetic forces produced in the respective stator coils in one solid casing 30, which have respectively different magnitudes, phases and directions, are combined into a single vibrating source and the magnitudes, phases, and directions are made uniform. Also, the use of the elastic sheets 21, 24 inside and/or outside of the solid casing 30 enables the electromagnetic forces to be absorbed, and as a result, to reduce the magnitudes of the electromagnetic forces.

Consequently, the individual electromagnetic forces produced in the respective stator conductors 11 to 16 are not exerted directly on the stator core 10, but they are exerted on the stator core 10 in such a manner that the vibrating sources are combined into one source and that the magnitudes of the vibrations are reduced and made uniform.

Figure 2:
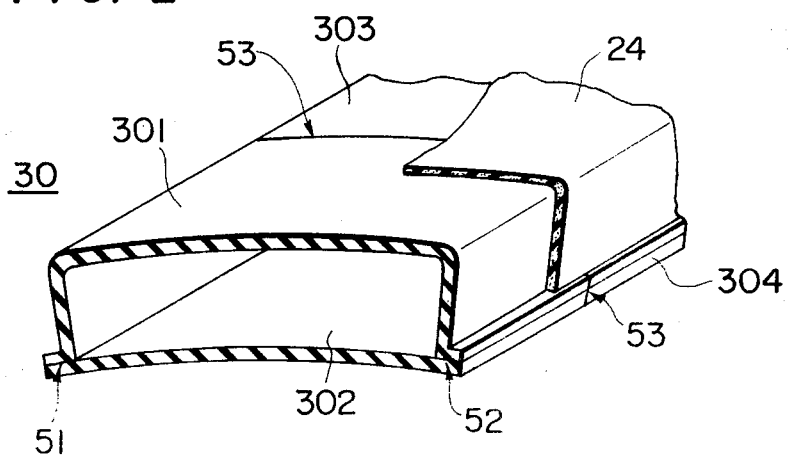
FIG. 2 is a perspective view, partly in section, of the solid casing for covering the stator winding structure in FIG. 1.

FIG. 2 shows an enlarged view of a unit component of the solid casing 30 of FIG. 1, in which the solid casing 30 is divided into two covers 301, 302 in the radial direction to facilitate the insertion of the stator coil 100. The stator coil 100 provided with the elastic sheet 21 is inserted in the interior of the outer cover 301. Thereafter, the inner cover 302 is secured to the outer cover 301 at joint surfaces 51, 52 in a suitable manner, and the resultant structure 30 is inserted and fixed in grooves 25, 26 provided in the supporting sticks 22, 23, with the elastic sheet 24 provided at the outer surface of the outer cover 301.

The solid casing 30 can also be fabricated in such a way, as illustrated in FIG. 2, that the solid casing 30 is divided into two or more covers in the axial direction, thereby to further facilitate the insertion of the stator coil 100. The outer covers 301, 303 and the inner covers 302, 304 are bonded after installation of the stator coil 100 at the joint surfaces 51, 52, and 53.

As the solid casing 30 performs a function to make uniform the various vibrations of the stator coil, it is preferable that the solid casing has significant mechanical strength against the electromagnetic forces and heat degradations. Also, the material for the solid casing preferably has a nonmagnetic character and a good workability. For example, it may be formed of a reinforced plastic material, such as fiber-reinforced plastic (which is commonly referred to as FRP).

Also, since the elastic sheets 21, 24 perform the function absorbing and reducing vibrations, it is preferable that the elastic sheets have elasticities and durabilities against repeated fatigues and insulations. For example, it may be formed of non-woven synthetic resin fabrics such as those sold by E. I. du Pont Company under the trademark "TEFLON" impregnated with synthetic resin or varnish, or glass based polyester laminations formed into wave-like plates.

Figure 3:
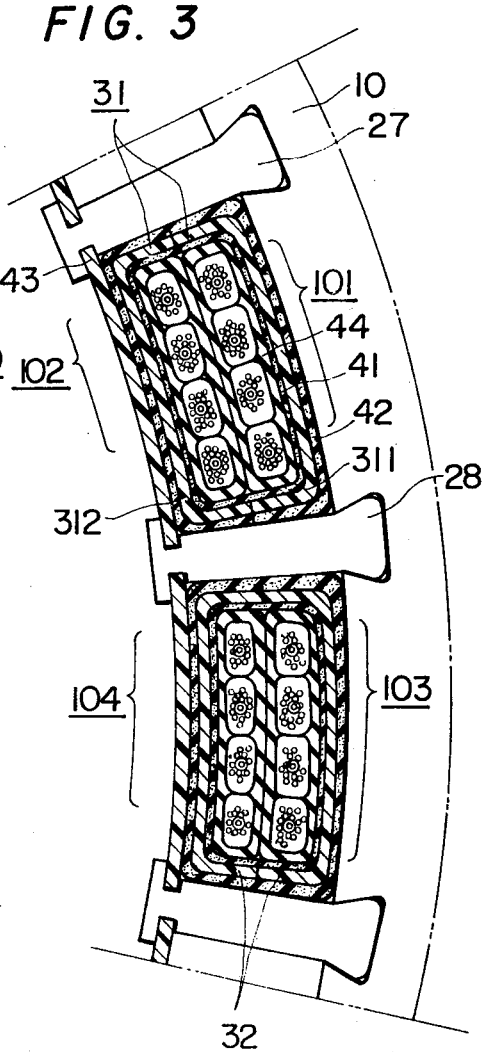
FIG. 3 is a transverse sectional view of a stator winding structure of another embodiment of the present invention.

FIG. 3 shows another embodiment of the present invention applied to a double layer winding. Where the winding factor is smaller than 1.0, the vibration modes of an overlying and underlying coil may be different from each other, and the vibration modes to which the stator core is subjected become complicated. The present embodiment illustrates a case where an overlying stator coil 101 and an underlying stator coil 102, and an overlying stator coil 103, and an underlying stator coil 104 are respectively grouped together and enclosed in solid casings 31, 32.

Hereafter, the description will be made with reference to the stator coils 101, 102 and the solid casing 31 of FIG. 3. The overlying stator coil 101 and the underlying stator coil 102 are grouped together by the solid casing 31 which is composed of a pair of covers including an outer cover 311 and an inner cover 312. The clearance defined within the solid casing 31 is filled with an elastic sheet 41 to absorb the vibrations produced in the stator coils 101 and 102. Also, the outer periphery of the solid casing 31 is covered with an elastic sheet 42 to absorb the vibrations transmitted to the stator core 10. The solid casing 31 thus covered with the elastic sheet 42 is attached and fixed to the inner surface of the stator core 10 with the aid of coil supporting sticks 27, 28 projecting radially from the surface of the stator core 10. The solid casing 31 is fixed to the inner surface of the stator core 10 by a supporting plate 43 fixed in respective grooves provided on the coil supporting sticks 27, 28.

As described above, in the case of the double layer winding, the overlying and underlying stator coils usually have electrically different phases. However, according to the present invention, the vibration sources in the respective stator coil 101, 102 are made integral into a single vibration source by the solid casing 31. It is also preferable to choose stator coils to be enclosed in a solid casing, such that an overlying stator coil and an underlying stator coil in the solid casing have the same electrical phase to minimize the magnitudes and to unify the phases and directions of the vibrations.

In the present embodiment for the double-layer winding, the overlying and underlying stator coils are grouped together and enclosed in a single solid casing contacting each other. However, it is also preferable to insert a suitable elastic layer or sheet between the contacting surfaces of the stator coils further to reduce the friction between the two stator coils within the solid casing. It is also preferable to enclose the respective stator coils in respective solid casings. In this case, an elastic sheet may be inserted between the two solid casings.

Although, in the present embodiment, the elastic sheets 41, 42 for absorbing vibrations are provided both on the outer periphery of the solid casing 31 and outer periphery of the earth insulation 44 surrounding the stator conductors, almost the same effects can be obtained even when one of the elastic sheets 41, 42 is eliminated. The inside elastic sheet 41 surrounding the outer periphery of the earth insulation 44 can be provided within the earth insulation 44, in which case, the earth insulation 44 may be provided on the outer periphery of the inside elastic sheet 41. Each elastic sheet 41, 42 provided inside and outside of the solid casing 31 may be split and inserted in the form of a plurality of pieces or layers without being made integral. Further, the respective elastic sheets 41, 42 can enhance the effects in such a way that the materials which have respectively different elastic modulus are employed in conformity with the vibration modes of the stator coils. The shape of the solid casing alters in dependence on the shape of the stator coils, the arrangement of the supporting sticks, the number of phases and layers of the stator coils, and the size of the rotary machine.

As described herein in detail, according to the present invention, the various vibration sources having different magnitudes, phases, and directions which are distributed all over the stator coil or coils are combined into a single vibration source within the respective solid casings, and the vibrations are reduced and made uniform. Further, according to the present invention, due to the reduction of the vibrations, the degradations of the electrical insulating layers and the stator core by the vibration stresses are significantly reduced or eliminated and a durable stator winding structure is obtained. Still more, according to the present invention, a simplified stator winding structure convenient for fabrications can be obtained.

What is claimed is:

1. A gap winding type electric rotary machine having a stator core, a rotor core disposed in a bore of said stator core, a stator winding disposed in a cylindrical gap defined between said stator core and said rotor core, and supporting means for fixing said stator winding on the inner surface of said stator core, said stator winding comprising a plurality of coils, characterized in that each of said coils is supported by said supporting means and comprises
   a plurality of conductors,
   electric insulating means covering and bundling said plurality of conductors,
   a solid and nonmagnetic casing enclosing said electric insulating means, and
   vibration absorbing means disposed between said electric insulating means and said solid and nonmagnetic casing.

2. The gap winding type electric rotary machine as defined in claim 1, wherein said solid and nonmagnetic casing comprises a plurality of detachable covers.

3. A gap winding type electric rotary machine having a stator core, a rotor core disposed in a bore of said stator core, a stator winding disposed in a cylindrical gap defined between said stator core and said rotor core, and supporting means for fixing said stator winding on the inner surface of said stator core, said stator winding comprising a plurality of coils, characterized in that each of said coils is supported by said supporting means and comprises
   a plurality of conductors,
   electric insulating means covering and bundling said plurality of conductors,
   a solid and nonmagnetic casing enclosing said electrically insulated conductors,
   first vibration absorbing means disposed between said electric insulating means and said solid and nonmagnetic casing, and
   second vibration absorbing means disposed between said solid and nonmagnetic casing and the inner surface of said stator core and between said solid and nonmagnetic casing and said supporting means.

4. The gap winding type electric rotary machine as defined in claim 3, wherein said solid and nonmagnetic casing comprises a plurality of detachable covers.

5. The gap winding type electric rotary machine as defined in claim 3, wherein said coils are disposed in first and second radially separated circumferential planes and have the same electrical phase.

6. A gap winding type electric rotary machine having a stator core, a rotor core disposed in a bore of the stator core, a cylindrical gap being defined between the stator core and the rotor core, a stator winding disposed in the gap, and supporting means to fix the stator winding on the inner surface of the stator core, characterized in that the stator winding comprises a plurality of coil unit groups, at least one of said coil unit groups being encapuslated in enveloping means for concentrating vibrations within the respective coil unit group, said enveloping means comprising a solid casing which is supported by said supporting means, and
   vibration absorbing means comprising an elastic sheet surrounding said at least one coil unit group and disposed at least at the inside of said casing between said at least one coil unit group and said casing.

7. A gap winding type electric rotary machine having a stator core, a rotor core disposed in a bore of the stator core, a cylindrical gap being defined between the stator core and the rotor core, a stator winding disposed in the gap, and supporting means to fix the stator winding on the inner surface of the stator core, characterized in that the stator winding comprises a plurality of coil unit groups, at least one of said coil unit groups being encapsulated in enveloping means for concentrating vibrations within the respective coil unit group, said enveloping means comprising a solid casing which is supported by said supporting means, and vibration absorbing means including an elastic sheet covering part of said casing and being disposed at least at the inside of said casing between said casing and said stator core.

8. The gap winding type electric rotary machine as defined in claim 7, wherein said vibration absorbing means further includes an elastic sheet within said casing surrounding said coil unit group and electrical insulating means covering said coil unit group within said elastic sheet.

9. A gap winding type electric rotary machine having a stator core, a rotor core disposed in a bore of the stator core, a cylindrical gap being defined between the stator core and the rotor core, a stator winding disposed in the gap, and supporting means to fix the stator winding on the inner surface of the stator core, characterized in that the stator winding comprises a plurality of coil unit groups, each of said coil unit groups comprising a plurality of coil units disposed in first and second radially separated planes, the coil units of each coil unit group having the same electrical phase, at least one of said coil unit groups being encapsulated in enveloping means for concentrating vibrations within the respective coil unit group, said enveloping means comprising a solid casing which is supported by said supporting means, and vibration absorbing means including an elastic sheet surrounding said coil unit group and disposed at least at the inside of said casing between said coil unit and said casing.

* * * * *